United States Patent [19]

Kim

[11] Patent Number: 5,081,188

[45] Date of Patent: Jan. 14, 1992

[54] PROCESSING ADDITIVES FOR TETRAFLUOROETHYLENE POLYMERS

[75] Inventor: Young H. Kim, Wilmington, Del.

[73] Assignee: E. I. du Pont de Nemours and Company, Wilmington, Del.

[21] Appl. No.: 500,049

[22] Filed: Mar. 23, 1990

[51] Int. Cl.$^5$ .............................................. C08L 27/18
[52] U.S. Cl. .................................. 525/186; 525/190; 528/481
[58] Field of Search .................. 525/186, 190; 528/481

[56] References Cited

U.S. PATENT DOCUMENTS

| | | | |
|---|---|---|---|
| 2,685,707 | 8/1954 | Llewellyn et al. | 18/55 |
| 2,985,918 | 5/1961 | Moore et al. | 18/55 |
| 3,054,761 | 9/1962 | Moore et al. | 260/2.5 |
| 3,207,825 | 9/1965 | Tully | 264/127 |
| 3,407,249 | 10/1968 | Landi | 264/49 |
| 3,592,877 | 7/1971 | Mullins | 525/186 |
| 3,679,614 | 7/1972 | Shah et al. | 260/2.5 M |
| 4,158,688 | 6/1979 | Pett et al. | 264/63 |
| 4,158,689 | 6/1979 | Pett et al. | 264/63 |

FOREIGN PATENT DOCUMENTS 943624  12/1963  United Kingdom .

OTHER PUBLICATIONS

J. F. Lontz et al., Ind. Eng. Chem., vol. 44, pp. 1805–1810.

*Primary Examiner*—Patricia Short

[57] ABSTRACT

A composition comprising tetrafluoroethylene polymers and selected poly(2,2-dialkylpropiolactones) that is useful as a molding compound is disclosed. Also provided is a process for the production and use of such a mixture and the pyrolysis of the mixture to give polytetrafluoroethylene parts.

40 Claims, No Drawings

PROCESSING ADDITIVES FOR TETRAFLUOROETHYLENE POLYMERS

FIELD OF INVENTION

A blend of tetrafluoroethylene polymers and polymers of selected poly(2,2-dialkylpropiolactones), and a process for making the blend are disclosed. Such blends are useful to improve processing of tetrafluoroethylene polymers, and readily undergo pyrolysis to give tetrafluoroethylene polymer parts.

BACKGROUND OF THE INVENTION

Fabrication of polytetrafluoroethylene (PTFE) and some copolymers of tetrafluoroethylene is often difficult, due to the fact that even above their melting points they flow little if at all. Thus typical plastics melt processing techniques are often useless with such polymers. Previous attempts have been made by others to make these polymers more processible, in order to make useable parts.

Thus U.S. Pat. No. 2,685,707 and J. F. Lontz, et. al., Ind. Eng. Chem., vol. 44. pp. 1805–1810 report that many low molecular weight organic compounds such as hydrocarbons and esters can be used as "lubricants" to aid in the forming of parts from particulate PTFE. The lubricants are removed typically by volatilization and/or sintering, and a solid part is produced by sintering the remaining PTFE.

U.S. Pat. Nos. 3,407,249 and 3,679,614 report that porous PTFE parts are produced by mixing particulate PTFE with poly(methyl methacrylate) (PMMA) and other compounds. The PMMA and other compounds can be removed by use of solvents for the PMMA such as acetone.

U.S. Pat. Nos. 2,985,918 and 3,054,761 describe a process for making and using a composition comprising PTFE and PMMA. This mixture may be sintered to volatilize and decompose the PMMA, and to sinter the PTFE, so that a porous PTFE article is produced.

Among the desired properties a material should impart to PTFE in order to help form PTFE parts, are, easy mixing of the components, good green strength of the mixture so parts of the mixture will not deform readily, especially under sintering conditions, and clean sintering of the processing aid (lubricant) so that the remaining PTFE part is free of impurities (e.g., ash and char) and has a minimum amount of porosity. It is the object of this invention to provide such a composition and a process for making and using it. None of the above references teaches the use of poly(2,2-dialkylpropiolactones) as processing aids or lubricants for PTFE.

SUMMARY OF THE INVENTION

A blend of polymers containing tetrafluoroethylene polymer (TFEP) and selected poly(2,2-dialkylpropiolactones) (PDAP) is provided. This polymer blend is useful for producing moldings and extrusions of TFEP. After a molding or extrusion part is formed, the PDAP may be removed from the part by pyrolysis; the PDAP is readily and cleanly pyrolyzed from the TFE containing polymer. Also provided is a process for making, and optionally pyrolyzing, the blend and parts thereof.

DETAILS OF THE INVENTION

This invention provides a polymer blend comprising about 5% to about 50% by weight of a first polymer consisting essentially of repeat units of the formula —(—$CH_2$—$CR^1R^2$—C(O)O—)—, and about 95% to about 50% by weight of a tetrafluoroethylene polymer, wherein $R^1$ and $R^2$ are independently chosen alkyl groups, and provided that the total number of carbon atoms in $R^1$ and $R^2$ is about 20 or less.

By the term "tetrafluoroethylene polymer" (herein TFEP) is herein meant a polymer of tetrafluoroethylene in which up to about 20 mole percent of the tetrafluoroethylene monomer may be substituted by other fluorinated monomers. Suitable fluorinated monomers include, but are not limited to, hexafluoropropylene, perfluoro(methyl vinyl ether), vinylidene fluoride and chlorotrifluoroethylene.

Polymers of the formula —(—$CH_2$—$CR^1R^2$—C(O)O—)— (herein PDAP) are preferably prepared by anionic polymerization (using tetraalkylammonium carboxylates as initiators) of 2,2-dialkylsubstituted -beta-propiolactones as disclosed in W. H. Sharkey in Ring Opening Polymerization, J. E. McGrath Ed., ACS Symposium Series 286, American Chemical Society, Washington, D.C., p. 373 and references cited therein. The monomeric beta-propiolactones are prepared by procedures described by. D. B. Johns, et. al., in Ring-Opening Polymerization, Vol. 1, K. J. Ivin and T. Saegusa, Eds., Elsevier Applied Science Publishers, New York, N.Y. 1984, Chap. 7. In addition to the polymerization of 2,2-dialkylsubstituted-beta-propiolactones, the polymers of this invention can also be produced by the polymerization of the cyclic carbonate of 2,2-dialkyl-substituted-3-hydroxypropionic acid, or of the free hydroxy acid itself. Such polymers are often referred to as poly(2,2-dialkylpropiolactones). In preferred PDAPs, $R^1$ and $R^2$ contain about 10 carbon atoms or less. In an especially preferred PDAP $R^1$ is methyl and $R^2$ is n-propyl. It is also preferred if the PDAP has a melting point below about 200° C. The molecular weight of the PDAP should not be too high or too low. The degree of polymerization should be at least about 70 to provide sufficient green strength to the blend. Although no upper limit is known for the PDAP molecular weight, very high degrees of polymerization (>20,000) will unnecessarily increase the viscosity of the (melted) blends. A preferred degree of polymerization range for the PDAP is about 100 to about 5,000.

In preferred blends the PDAP is about 10% to about 30% by weight and the TFEP is about 90% to about 70% by weight. In especially preferred blends the PDAP is about 15% to about 25% by weight and the TFEP is about 85% to about 75% by weight.

These blends are useful as molding resins which have high green strengths. It is well known in the art that many TFEPs are difficult to process, exhibiting very high melting points, and even above their melting points, have very poor flow characteristics. These blends allow the processing of TFEPs into useful objects by methods such as extrusion and injection molding (infra). In addition, if desired, the PDAP in the blend is easily and cleanly pyrolyzed from the blend to give "pure" TFEP objects (infra). The blends may be made by the processes described below.

Other materials commonly present in polymers may also be present, such as, but not limited to fillers, pigments, and antioxidants, as long as the above proportions of TFEP and PDAP are maintained.

Also provided in this invention is a process of making polymeric parts, comprising:

(a) mixing about 5% to about 50% by weight of a first polymer consisting essentially of repeat units of the formula —(—CH$_2$—CR$^1$R$^2$—C(O)O—)—, with about 95% to about 50% by weight of a tetrafluoroethylene polymer, wherein R$^1$ and R$^2$ are independently chosen alkyl groups, and provided that the total number of carbon atoms in R$^1$ and R$^2$ is about 20 or less, to form a blend;

(b) melt blending said blend at a temperature above the glass transition temperature and melting point of said first polymer but below about 270° C.; and (c) forming said blend into a shaped part.

The definition of the tetrafluoroethylene polymer is as given above. Preferred PDAPs and preferred proportions of TFEP and PDAP are as enumerated above.

Mixing of the polymers may be accomplished in several ways. For example, simple dry powder blending may be used, although care should be exercised to obtain a uniform blend. A preferred mixing method is to dissolve the PDAP in a solvent such as methylene chloride, and adding this solution to an agitated slurry of the TFEP. The liquid used to make the slurry of TFEP should be miscible with the solvent for the PDAP, but should be a nonsolvent for the PDAP. While the resulting slurry is agitated, the solvents are evaporated to give a blend of the polymers.

It has been found that some types of TFEP "powders" give blends that are agglomerated at this point. They may be rendered into a more useful form (powders) by grinding, as with a mortar and pestle, a ball mill or a hammer mill. It has been found that so-called "granular TFEPs" give blends that are powders (or granular) at this point without the need for grinding. Such granular TFEPs are preferred and may be made by the processes described in: U.S. Pat. No. 2,936,301; or U.S. Pat. No. 3,766,133 followed by deagglomeration in a mechanical mill. Such polymers are also described by American Society for Testing Material Specification D-4894-89, Type 3 Grade 1 and Type 2.

The melt blending of the blend may be accomplished by a variety of methods known to those skilled in the art of polymer processing. For example, compression molding, that is applying pressure and heat in a hydraulic press may be used. A preferred method is a screw melter, such as in a screw extruder. This provides good mixing to provide a uniform blend. The melt blending should be carried out at a temperature high enough to melt the PDAP, above its melting point, or if the polymer is not crystalline, above its glass transition temperature. The temperature should be kept below about 270° C. to avoid decomposition of the PDAP and/or gross separation of the PDAP and the TFEP. After the blend is melt blended the product may be pelletized in conventional ways for further processing into a shaped part, or may be formed directly from the melted state into a shaped part as by compression molding, extrusion through a die and injection molding. Further processing into a shaped part at a later time could also be by these methods, although melting of the PDAP may not be necessary to form a shaped part. For example, moderate heat and high pressure may cause the blend to flow by plastic deformation into a shaped part. However a melt process is preferred to form the shaped part.

After the shaped part is formed, it may be used as is, having the "composite" properties of the blend constituents. However, in order to improve certain properties such as solvent, chemical and high temperature resistance, it may be desirable to remove the PDAP so that essentially pure TFEP (plus any other nonvolatile ingredients such as filler and pigments) remains. This can be accomplished by the optional additional step of pyrolysis of a shaped part of the blend. This comprises the additional step of pyrolyzing the shaped part from 275° C. to about 400° C., preferably about 300° C. to about 350° C. until the PDAP is converted to volatile products.

The pyrolysis may be carried out in air, or in an inert atmosphere such as nitrogen. Air is preferred. As is known to those skilled in the art, pyrolyses such as these may cause porosity in the resulting TFEP part. This porosity may be minimized by raising the temperature of the shaped part slowly as the decomposition point of the PDAP (>275° C.) is approached and passed. Porosity that occurs may be reduced by densifying the pyrolyzed part. Densifying the part may be done by heating the part at about 350° C. to about 400° C. for an additional period after pyrolysis is completed. Such procedures are known in the art. It is also known in the art that the properties of the resulting pyrolyzed part may be affected by the manner in which the part is cooled after the pyrolysis or densification.

The following Examples illustrate the invention. In these Examples various grades of Teflon Fluorocarbon Resin (Trademark of and available from E. I. du Pont de Nemours & Co., Inc., Wilmington, Del.) are used. These grades, except as noted, are homopolymers of tetrafluoroethylene, and are so-called granular materials. Melt Index tests were performed according to ASTM D-1238 using a 15 kg weight, and except where noted were done at 200° C. Tensile strength (TS), tensile modulus (TM) and percent tensile elongation to break (EB) were measured on an Instron tester at a crosshead speed of 2.54 cm/min at about 25° C., except where otherwise noted. By green strength is meant the properties of unpyrolyzed blend. Injection molding was done on a one-ounce (28 g) ram injection molding machine with a barrel temperature of 150° C., using a 3.2×12.7×127 mm flex bar mold. In all of the Examples, PDAP refers to poly(2-methyl-2-n-propylpropiolactone).

EXAMPLE 1

Enough methanol was added to 80 g of Teflon 7A so that the Teflon was barely covered. To this was added over a period of 30 to 60 min one-quarter of a solution of 80 g of PDAP in methylene chloride. The Teflon slurry was agitated while the PDAP solution was being added. The slurry was agitated while the solvent was then evaporated with a stream of nitrogen. A fine powder was obtained.

EXAMPLES 2-11

Using procedures similar to that in Example 1, various blends of Teflon with PDAP were prepared. The ratios of PDAP to Teflon were varied by adjusting the amounts of PDAP solution and Teflon used. These mixtures, and some of their melt indicies, are given in Table 1. The melt index tests produced rods approximately 2 mm in diameter which were further tested (see Example 12).

TABLE 1

| Example | Teflon Used | Percent PDAP | Melt Index g/min. |
|---------|-------------|--------------|-------------------|
| 2 | 7A | 20 | 0.67–0.12 |
| 3 | 7A | 5 | — |

TABLE 1-continued

| Example | Teflon Used | Percent PDAP | Melt Index g/min. |
|---|---|---|---|
| 4 | 7A | 10 | very small |
| 5 | 7A | 15 | 0.0058 ± 0.0015 |
| 6 | 7A | 20 | — |
| 7 | 7C | 20 | — |
| 8 | 7C | 20 | — |
| 9 | 7A | 20 | — |
| 10 | 7A | 25 | 2.77 ± 0.71 |
| 11 | 7A | 30 | 41.2 ± 41.4 |

EXAMPLE 12

This Example illustrates pyrolyzing (sintering) of the polymer blends. Rods from Examples 2, 6, and 7 (all contain 20% PDAP) were combined and used in this Example.

These rods were heated in a furnace to 275° C. at a rate of 2° C./min in an air atmosphere, and held at that temperature for 3 hr. The temperature was then raised to 380° C. at a rate of 1° C./min, and then held at 380° C. for 3 hr. The recovered rods showed a loss of weight of 19.2 +/−0.27% (9 samples), shrinkage in the machine direction of 31.0 +/−3.0% (6 samples), and little or no change in the transverse direction.

Different rods were also pyrolyzed at 325° C. in air by putting them into a furnace that was at 325° C. The rods turned brown in about 5 min, and then appeared to be a black chary material after 10 min (total). The color started to fade in 2-3 hr and white materials were obtained in 4 to 70 hr. The samples, which were not pyrolyzed completely, had black spots all over, but especially at the surface.

Physical properties of green (unpyrolyzed) rods, and the rods pyrolyzed at 380° C. and 325° C. are given in Table 2.

TABLE 2

| | No Pyrolysis* | Pyrolyzed at 380° C.* | Pyrolyzed at 325° C.* |
|---|---|---|---|
| TS (psi) | 1140 ± 58 | 1230 ± 74 | 3406 |
| TM (Kpsi) | 20.4 ± 7.5 | 32.2 ± 11.0 | 29 |
| EB (%) | 22.3 ± 5.3 | 15.1 ± 4.6 | 48.3 |

*Crosshead speed 0.51 cm/min.

EXAMPLE 13

By a procedure similar to that in Example 1, 200 g of a blend of PDAP (20%) and Teflon 7A (80%) was prepared. The sample was injection molded to form flex bars. Strips about 10 microns thick were cut along the machine direction from these bars. Some strips were placed in an oven at 325° C. or 345° C. under an air atmosphere. At 325° C. the strips pyrolyzed cleanly in 12 hr. At 345° C. the strips had pyrolyzed cleanly in less than 6 hr, but some strip edges had fibrillated. Good intact pyrolyzed strips were obtained at 325° C., these strips having shrunk about 30% in the machine direction. The physical properties of green (unpyrolyzed) strips and strips pyrolyzed at 325° C. are given in Table 3.

TABLE 3

| | Unpyrolyzed | Pyrolyzed |
|---|---|---|
| TS (psi) | 1284 ± 167 | 1887 ± 101 |
| TM (Kpsi) | 26.1 ± 3.7 | 40.6 ± 2.7 |
| EB (%) | 32.2 ± 12.4 | 43.2 ± 9.0 |

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

I claim:

1. A polymer blend, comprising, about 5% to about 50% by weight of a first polymer consisting essentially of repeat units of the formula —(—CH$_2$—CR$^1$R$^2$—C-(O)O—)—, and about 95% to about 50% by weight of a tetrafluoroethylene polymer, wherein R$^1$ and R$^2$ are independently chosen alkyl groups, and provided that the total number of carbon atoms in R$^1$ and R$^2$ is about 20 or less.

2. A composition as recited in claim 1 wherein said first polymer is present from about 10% to about 30% by weight, and said tetrafluoroethylene polymer is present from about 90% to about 70% by weight.

3. A composition as recited in claim 1 wherein said first polymer is present from about 15% to about 25% by weight, and said tetrafluoroethylene polymer is present from about 85% to about 75% by weight.

4. A composition as recited in claim 1 wherein said total number of Carbon atoms in said R$^1$ and R$^2$ is 10 or less.

5. The composition as recited in claim 1 wherein said R$^1$ is methyl and said R$^2$ is n-propyl.

6. The composition as recited in claim 2 wherein said R$^1$ is methyl and said R$^2$ is n-propyl.

7. The composition as recited in claim 3 wherein said R$^1$ is methyl and said R$^2$ is n-propyl.

8. The composition as recited in claim 1 wherein said first polymer has a melting point of about 200° C. or less.

9. The composition as recited in claim 3 wherein said first polymer has a melting point of about 200° C. or less.

10. The composition as recited in claim 1 wherein said first polymer has a degree of polymerization of about 70 to about 20,000.

11. The composition as recited in claim 1 wherein said first polymer has a degree of polymerization of about 100 to about 5,000.

12. A process of making polymeric parts, comprising:
    (a) mixing about 5% to about 50% by weight of a first polymer consisting essentially of repeat units of the formula —(—CH$_2$—CR$^1$R$^2$—C(O)O—)—, with about 95% to about 50% by weight of a tetrafluoroethylene polymer, wherein R$^1$ and R$^2$ are independently chosen alkyl groups, and provided that the total number of carbon atoms in R$^1$ and R$^2$ is about 20 or less, to form a blend;
    (b) melt blending said blend at a temperature above the glass transition temperature and melting point of said first polymer but below about 270° C.; and
    (c) forming said blend into a shaped part.

13. A process as recited in claim 12 wherein said first polymer is present from about 10% to about 30% by weight, and said tetrafluoroethylene polymer is present from about 90% to about 70% by weight.

14. A process as recited in claim 12 wherein said first polymer is present from about 15% to about 25% by weight, and said tetrafluoroethylene polymer is present from about 85% to about 75% by weight.

15. A process as recited in claim 12 wherein said total number of carbon atoms in said R$^1$ and R$^2$ is 10 or less.

16. The process as recited in claim 12 wherein said $R^1$ is methyl and said $R^2$ is n-propyl.

17. The process as recited in claim 13 wherein said $R^1$ is methyl and said $R^2$ is n-propyl.

18. The process as recited in claim 14 wherein said $R^1$ is methyl and Said $R^2$ is n-propyl.

19. The process as recited in claim 12 wherein said first polymer has a melting point of about 200° C. or less.

20. The process as recited in claim 14 wherein said first polymer has a melting point of about 200° C. or less.

21. The process as recited in claim 12 wherein said first polymer has a degree of polymerization of about 70 to about 5,000.

22. The process as recited in claim 12 wherein said forming is done by melt forming.

23. The process as recited in claim 12 wherein said melt blending is done by a screw melter.

24. The process as recited in claim 22 wherein said melt forming is done by a process selected from compression molding, extrusion through a die and injection molding.

25. The process as recited in claim 16 wherein said forming is done by melt forming.

26. The process as recited in claim 16 wherein said melt blending is done by a screw melter.

27. The process as recited in claim 26 wherein said melt forming is done by a process selected from compression molding, extrusion through a die and injection molding.

28. The process as recited in claim 12 further comprising pyrolyzing said shaped part at a temperature from about 275° C. to about 400° C., until said first polymer is volatilized.

29. The process as recited in claim 28 wherein said pyrolysis is carried out at about 300° C. to about 350° C.

30. The process as recited in claim 16 further comprising pyrolyzing said shaped part at a temperature from about 275° C. to about 400° C., until said first polymer is volatilized.

31. The process as recited in claim 30 wherein said pyrolysis is carried out at about 300° C. to about 350° C.

32. The process as recited in claim 12 wherein said mixing is carried out by steps, comprising:
 (a) dissolving said first polymer in a solvent to form a solution;
 (b) slurrying said polytetrafluoroethylene polymer in a nonsolvent for said first polymer to form a slurry;
 (c) while agitating said slurry, adding said solution to said slurry; and
 (d) evaporating said solvent and said nonsolvent.

33. The process as recited in claim 32 wherein said polytetrafluoroethylene polymer is a granular material.

34. The process as recited in claim 16 wherein said mixing is carried out by steps, comprising:
 (a) dissolving said first polymer in a solvent to form a solution;
 (b) slurrying said polytetrafluoroethylene polymer in a nonsolvent for said first polymer to form a slurry;
 (c) while agitating said slurry, adding said solution to said slurry; and
 (d) evaporating said solvents and said nonsolvent.

35. The process as recited in claim 34 wherein said polytetrafluoroethylene polymer is a granular material.

36. The process as recited in claim 28 wherein said mixing is carried out by steps, comprising:
 (a) dissolving said first polymer in a solvent to form a solution;
 (b) slurrying said polytetrafluoroethylene polymer in a nonsolvent for said first polymer to form a slurry;
 (c) while agitating said slurry, adding said solution to said slurry; and
 (d) evaporating said solvent and said nonsolvent.

37. The process as recited in claim 36 wherein said polytetrafluoroethylene polymer is a granular material.

38. The process as recited in claim 12 wherein said mixing is done by dry powder blending.

39. The process as recited in claim 32 wherein said mixing is done by dry powder blending.

40. The process as recited in claim 28 wherein said mixing is done by dry powder blending.

* * * * *